United States Patent [19]

Takasaki et al.

[11] Patent Number: 4,969,201
[45] Date of Patent: Nov. 6, 1990

[54] METHOD OF RECOGNIZING A CIRCULAR ARC SEGMENT FOR AN IMAGE PROCESSING APPARATUS

[75] Inventors: Naruto Takasaki, Kawasaki; Nobuyuki Shimizu, Hatsukaichi; Yutaka Tanaka, Yokohama, all of Japan

[73] Assignee: Hitachi Software Engineering Co., Ltd., Yokohama, Japan

[21] Appl. No.: 254,846

[22] Filed: Oct. 7, 1988

[30] Foreign Application Priority Data

Oct. 8, 1987 [JP] Japan ................. 62-254939

[51] Int. Cl.$^5$ ............................................. G06K 9/48
[52] U.S. Cl. ......................................... 382/22; 382/56; 382/29; 382/25; 358/426
[58] Field of Search ................. 382/22, 56, 29, 25; 358/426

[56] References Cited

U.S. PATENT DOCUMENTS 4,566,124 1/1986 Yamamoto et al. ................. 382/22
4,748,675 5/1988 Suzuki et al. ...................... 382/22
4,783,829 11/1988 Miyakawa et al. ................. 382/22

OTHER PUBLICATIONS

Proceedings of the 27th Conference of the Japanese Society of Data Processing, pp. 965–966, 1983.

Primary Examiner—David K. Moore
Assistant Examiner—Michael Razavi
Attorney, Agent, or Firm—Fay, Sharpe, Beall, Fagan, Minnich & McKee

[57] ABSTRACT

A method of recognizing an arcuate or circular arc segment is used with an image processing apparatus. In a first step, two arbitray image structuring points are selected as segmenting end points from the dot-line image data. next, an image structuring point among the image structuring points present within a segment divided by the segment end points that is located furthest from and in a direction perpendicular to a straight line connecting the given structuring points and within a distance which is equal to or larger than a constant distance is extracted. The, three consecutive, adjacent polygonal-line structuring points are recognized as an arcuate or circular arc segment when a distance between a virtual circle passing through the three adjacent points and a median point of two line segments formed by the three consecutive points is equal to or less than the constant distance.

4 Claims, 6 Drawing Sheets

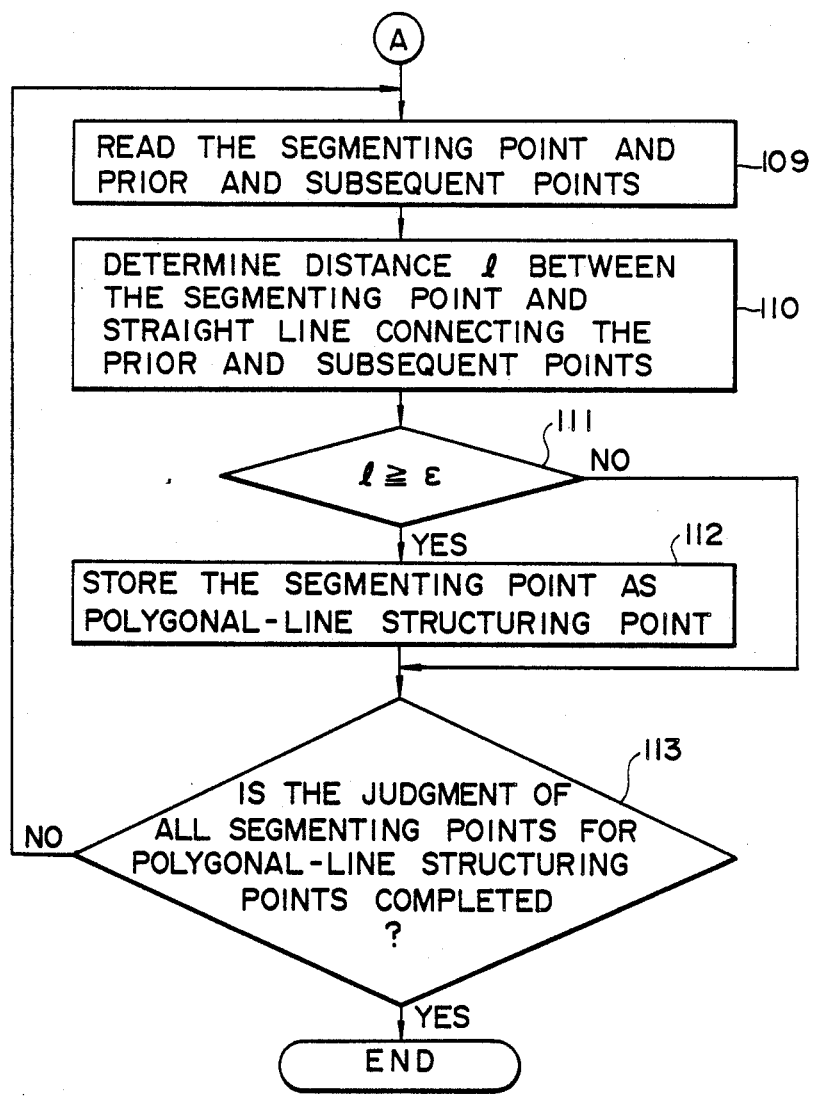

METHOD OF RECOGNIZING A CIRCULAR ARC SEGMENT FOR AN IMAGE PROCESSING APPARATUS

BACKGROUND OF THE INVENTION

The present invention relates to a method of recognizing an arcuate or circular arc segment for an image processing apparatus and, more particularly, to a method of recognizing an arcuate or circular arc segment for an image processing apparatus suitable for separating a circle and an arcuate or circular arc segment in a drawing data.

DESCRIPTION OF RELATED ART

In digitizing a line drawing and processing drawing data by a computer aided design apparatus, there is required the function of extracting configuration lines from a drawing in which various segments of lines are admixed, correcting the configuration lines, and classifying the lines into drawing elements. In this case, for instance, as the line drawing is digitized, it is desired that a circle and a circular arc or arcuate segment are correctly recognition processed as well as approximated into a polygonal line.

Heretofore, as a technique of effecting the recognition processing of a circular arc or arcuate segment of the type as has been described hereinabove, there is one which has been discussed on pages 965 and 966 of the Proceedings of the 27th Conference of the Japan Society of Data Processing (latter part of 1983). This is a recognition technique for judging a circle and an arcuate or circular arc segment from a configuration of a graph, as shown in FIG. 6, which comprises the steps of determining a given pixel b(i) located at the i-th position of a pixel line b(m) which is image data of a dot line or dot-line image data, determining a distance d(i) from the given pixel b(i) to a point lying on a straight line connecting a prior pixel b(i+n) located at the n-th position of the pixel line b(m) prior to the given pixel b(i) and a subsequent pixel b(i−n) located at the n-th position thereof subsequent thereto, the distance d(i) being in a direction perpendicular to the straight line, and drawing a graph of distances d(i) versus respectively given pixel b(i) using the pixel line as the x-coordinate and the distances as the y-coordinate. In the graph of the distances d(i) with respect to the pixels b(i) as given in the manner described hereinabove, there is the basic characteristic that a portion where a configuration of the dot-line pixels b(i) is in a straight line has a value of zero, a portion where it is of a corner shape has a threshold limit value, and a portion where it is of an arcuate or circular arc segment has a constant value other than zero. This basic characteristic permits a recognition of an image shape constituted by pixels of a dot line.

In recognizing and separating the circular arc or arcuate segment by means of the technique as described hereinabove, the circular arc or arcuate segment is recognized and separated by judging an arcuate or circular arc segment in the graph of the distances of a dot line as a constant value other than zero. However, the value may deviate with digital noise so that a judgment for a boundary of the circular arc or arcuate segment is rendered difficult. Accordingly, as a circle and a circular arc or arcuate segment get smaller, the judgment is rendered more difficult and requires a longer period of time.

In the image recognition processing by means of such a technique as described hereinabove, it is noted that the pixel line in the image data is recognition processed by means of statistics so that the judgment processing is made difficult.

SUMMARY OF THE INVENTION

Therefore, an object of the present invention is to provide a method of recognizing a circular arc or arcuate segment adapted to be used with an image processing apparatus, which enables a judgment of a small circle and a small circular arc or arcuate segment and which permits the judgment processing for such a circle and circular arc or arcuate segment.

In order to achieve the objects described hereinabove, the arcuate or circular arc segment recognition processing for the image processing apparatus in accordance with the present invention selects two arbitrary image structuring points from dot-line image data as given structuring points, to extract as a point for structuring a polygonal line, or a polygonal-line structuring point, an image structuring point from image structuring points present in a segment segmented by the two given structuring points, which is located the maximum distance among them apart from and in a direction perpendicular to a straight line connecting the given structuring points and which is in a distance equal to or larger than a constant distance, to draw the polygonal-line structuring points in a polygonal line, and to recognize a range of such three consecutive, adjacent polygonal-line structuring points as a circular arc or arcuate segment, when a distance between a virtual circle and a median point of each of two segments is equal to or smaller than the constant distance, the virtual circle being arranged so as to pass the three consecutive, adjacent polygonal-line structuring points and the median point being of the segment formed by the three polygonal-line structuring points.

In the circular arc or arcuate recognition method, the polygonal-line structuring point is extracted from the dot-line image data and the dot-line image data is drawn by a polygonal line, thereby providing polygonal-line data. As the polygonal-line structuring point for conversion into a polygonal line is extracted, the image structuring point from the image structuring points present in a segment divided by the two arbitrary image structuring points selected as the given structuring points from the dot-line image data, which is located in the maximum distance, among the image structuring points present in the segment, apart from and in a direction perpendicular to the straight line connecting the two given structuring points and whose maximum distance is equal to or less than the constant distance. This permits an extraction of the polygonal-line structuring points which are in a state that all of the pixel line segments constituting the dot-line image data are present within a constant range apart and a constant distance from a straight center line connecting the two adjacent polygonal-line structuring points in a segment between the two adjacent polygonal-line structuring points.

In accordance with the present invention, which segment to be recognized as a circular arc or arcuate segment is judged as to whether or not, for each of polygonal-line structuring points obtained by conversion into a polygonal line, a distance between the virtual circle and the median point is equal to or less than the constant distance, the virtual circle being arranged so as to pass the three adjacent polygonal-line structuring points of the polygonal-line structuring points data and the median point being each of two line segments formed by the three adjacent polygonal-line structuring points. When it is judged that the distance between the virtual circle and the median point is equal to or less than the constant distance, a range of the three polygonal-line structuring points is recognized as an arcuate or circular arc segment. In other words, this allows the virtual circle and the dot-line image data of the dot-line pixels to be judged as being present within a constant distance from the straight center line connecting the two polygonal-line structuring points adjacent to each other in a range constituted by the three polygonal-line structuring points. That is, this distinguishes and recognizes a portion of an arcuate or circular arc segment or a portion of a regular polygon having a substantially large number of corners from a portion of a regular polygon having a small number of corners.

The other objects and features of the present invention will become apparent in the course of description on the following preferred embodiments in conjunction with the drawings appended hereto.

BRIEF DESCRIPTION OF THE DRAWINGS

FIGS. 2A and 2B are flow charts illustrating the processing flow for processing the image data into polygonal lines.

DESCRIPTION OF THE PREFERRED EMBODIMENTS

Figure 1:
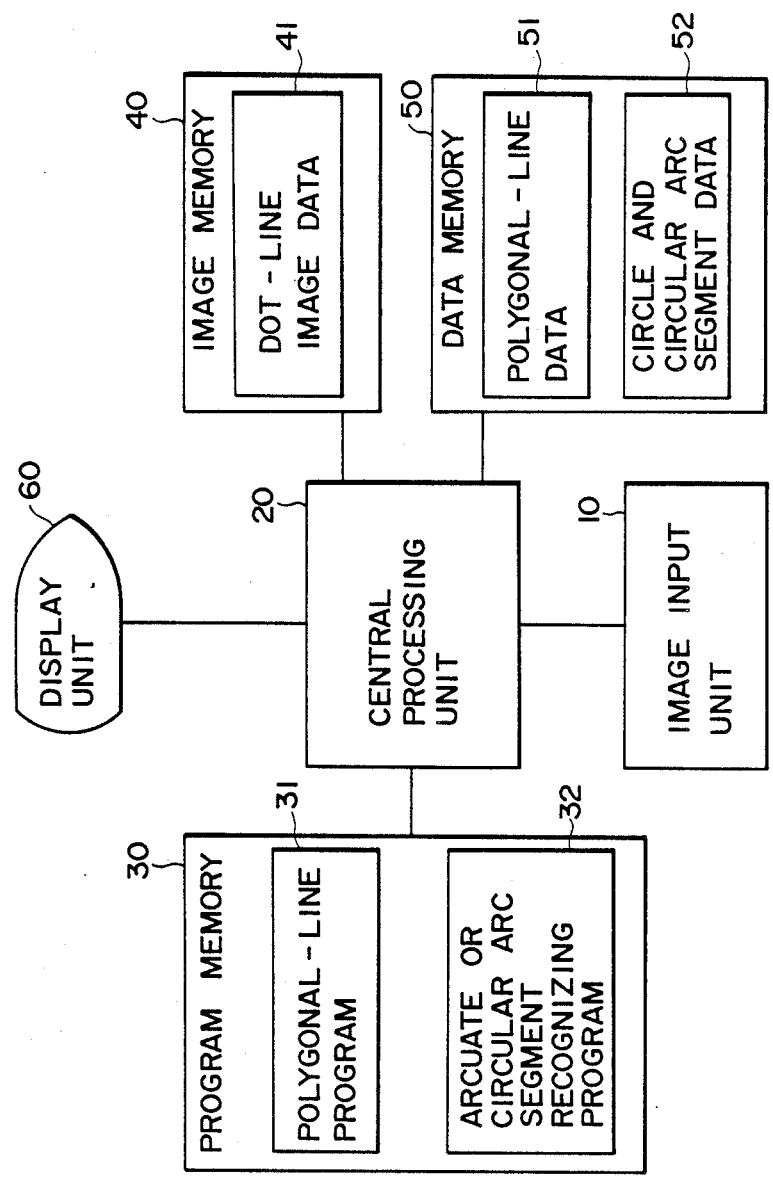
FIG. 1 is a block diagram illustrating a construction of an image processing apparatus as an example according to the present invention.

As shown in FIG. 1, an image processing apparatus illustrating one example according to the present invention comprises an image input unit 10 for inputting an image, a central processing unit 20 for effecting various processing, a program memory 30 for storing a program necessary for processing by the central processing unit 20, an image memory 40 for storing dot-line image data 41 for inputting an image data from the image input unit 10, a data memory 50 for storing a polygonal-line data 51 as well as a circle and arcuate or circular arc segment data 52, and a display unit 60 for displaying the polygonal-line data 51 and the circle and arcuate or circular arc segment data 52.

In the program memory 30 are stored a polygonal-line program 31 for converting the dot-line image data 41 constituted by dot-line pixels into a polygonal line, and an arcuate or circular arc segment recognizing program 32 for separating the circle and the circular arc or arcuate segment data 52 from the polygonal-line data 51. The central processing unit 20 is designed so as to effect the processing of the dot-line image data 41 of the image memory 40 on the basis of the polygonal-line program 31 of the program memory 30 and store the polygonal-line data 51 in the data memory 50. Furthermore, the central processing unit 20 separates an arcuate or circular arc segment from the polygonal-line data 51 of the data memory 50 on the basis of the arcuate or circular arc segment recognizing program 32 of the program memory 30 and stores the separated arcuate or circular arc segment as the circle and the arcuate or circular arc segment data 52 in the data memory 50. The central processing unit 20 further provides the display unit 60 with the dot-line image data 41 of the image memory 40 by distinguishing the arcuate or circular arc segment from the polygonal-line data 51 and the circle and circular arc or arcuate segment data 52 in different colors.

Figure 2A:
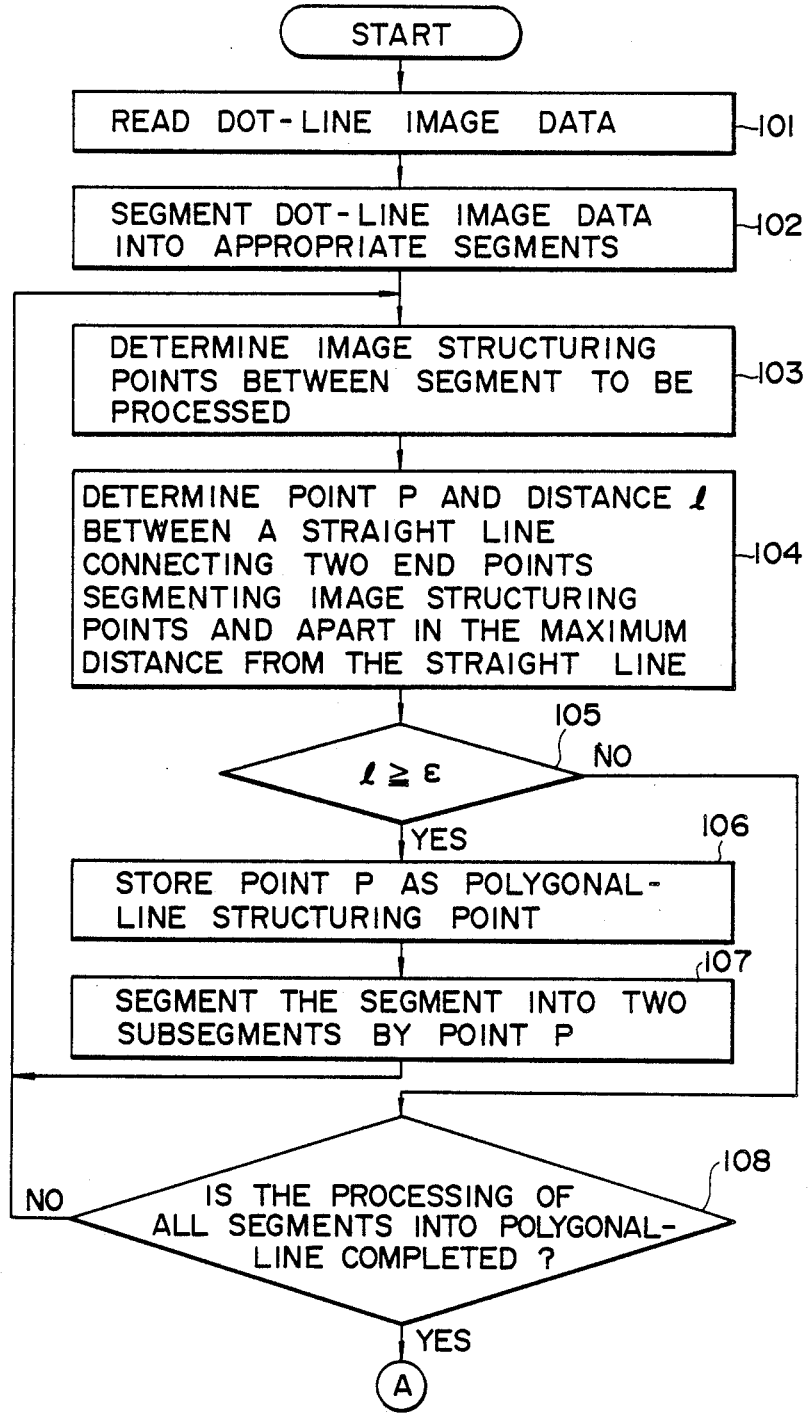
Figure 3:
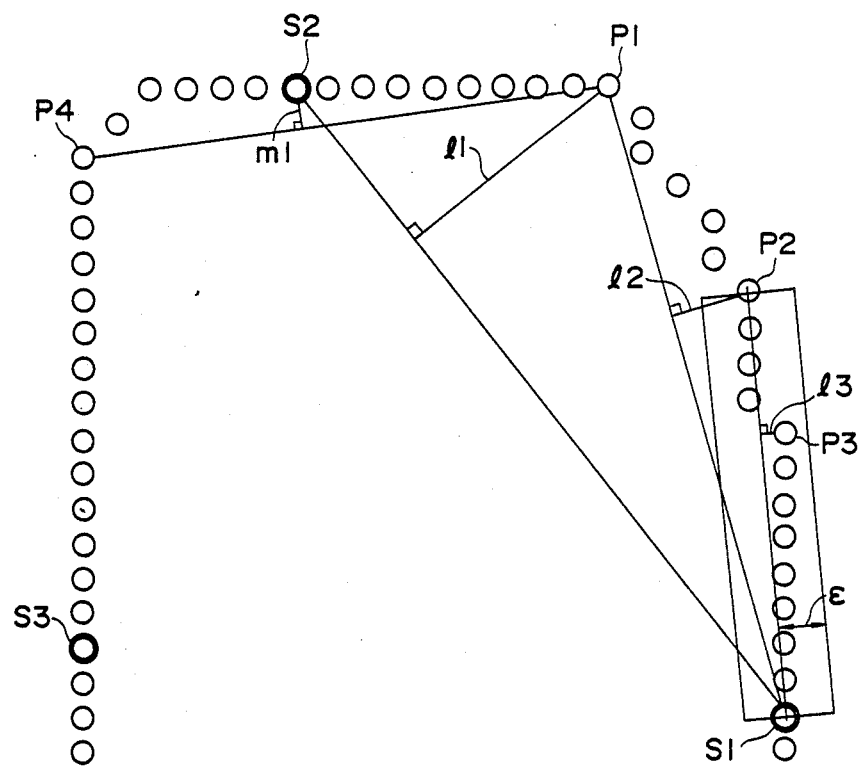
FIG. 3 is an explanation view for explaining the principle of the polygonal line processing.

FIGS. 2A and 2B are flow charts illustrating the processing flow of the polygonal-line processing. FIG. 3 is an explanation view for explaining the principle of the polygonal-line processing. The polygonal-line processing will be described in conjunction with FIG. 3.

Given the dot-line image data 41 constituted by pixels of a dot line in the image memory 40, the dot-line image data 41 is read into the central processing unit 20 from the image memory 40 and the polygonal-line processing is effected. More specifically, the dot-line image data consisting of the dot-line pixels is read in at step 101. At step 102, the dot-line image data is segmented into an appropriate number of segments and each of the segments is processed for conversion into a polygonal line by means of steps following step 103.

At step 103, a segment given to be processed, for example, a segment segmented by a first segmenting end point S1 and a second segmenting point S2 as shown in FIG. 3, is segmented to provide image structuring points. Then at step 104, there are determined, among the image structuring points present in the segment, an image structuring point P located the maximum distance apart from and in a direction perpendicular to a straight line connecting the first and second segmenting end points S1 and S2, and a distance l between the straight line and the structuring point P. For instance, there are given a point P1 and a distance l1 as shown in FIG. 3. The flow then proceeds to step 105 and it is judged whether or not the distance l1 given at step 104 is equal to or larger than a constant distance ε. If the distance l is equal to or larger than the constant distance ε, the flow proceeds to step 106 and the point P is stored as a polygonal-line structuring point. At step 107, the segment is further segmented into two subsegments by the point P. The flow then returns back to step 103, and each of the subsegments is likewise processed for conversion into a polygonal line, therby extracting and storing a polygonal-line structuring point. For instance, as shown in FIG. 3, point P1 and distance l1, point P2 and distance l2, and point P3 and distance l3 are determined in this order, and the points P1, P2 and P3 are extracted and stored as polygonal-line structuring points. On the contrary, when it is judged that the distance l is less than the constant distance at step 105, the point P is not given as a polygonal-line structuring point so that the flow advances to step 108 where it is judged whether or not the polygonal-line processing of all subsegments has been completed. If it is judged that there is a segment which is left unprocessed for conversion into a polygonal line, that is, for the processing of extracting a polygonal-line structuring point, the flow then returns back to step 103 and the polygonal-line processing is repeated. When the processing of all the segments for conversion into a polygonal line has been finished, the flow then proceeds to step 109 where it is judged whether or not a segmenting point obtained by segmenting the image data of a dot line into appropriate segments at step 102, for example, point S1, point S2, point S3, ..., point Si, as shown in FIG. 3, constitutes a polygonal-line structuring point.

At step 109, the segmenting point as well as the points prior to and subsequent to the segmenting point, respectively, are read in. For instance, as shown in FIG. 3, there are read the segmenting point S2, a prior point P1 and a subsequent point P4. Then at step 110, there is determined a distance l between the segmenting point and the straight line connecting the prior and subsequent point in a direction perpendicular to the straight line. For instance, as shown in FIG. 3, a distance m1 between the segmenting point S2 and the straight line is given. The flow then proceeds to step 111, and it is judged therein whether or not the distance l determined is equal to or larger than a constant distance $\epsilon$. When the distance l is equal to or larger than the constant distance $\epsilon$ at step 111, on the one hand, the flow then proceeds to step 112 and the segmenting point, for example, the point S2, is stored as a polygonal-line structuring point. Then the flow advances to step 113. When the distance l is shorter than the constant distance $\epsilon$ at step 111, on the other hand, the segmenting point does not constitute a polygonal-line structuring point so that the flow proceeds to step 113 where it is judged whether or not all of the segmenting points constitute polygonal-line structuring points. When it is judged that any segmenting point is left unjudged for a polygonal-line structuring point, the flow then returns back to step 109 where the segmenting point is judged as to whether to constitute a polygonal-line structuring point. When all of the segmenting points are judged for polygonal-line structuring points, the processing of polygonal-line structuring points is completed.

It is noted that an end point of the image data of a dot line naturally leads to a segmenting point as well as a polygonal-line structuring point in the processing of segmenting the dot-line image data into appropriate segments at step 102 so that, for instance, the end point is stored as a polygonal-line structuring point at step 102 without the judgment processing of the polygonal-line structuring points at step 102 to step 113.

As have been described hereinabove, the dot-line image data 41 of the image memory 40 is subjected to the processing for conversion into a polygonal line, thereby giving the polygonal-line data 51 and storing the polygonal-line data in the data memory 50.

There will now be described the processing for judging an arcuate or circular arc segment for obtaining the arcuate or circular arc segment data 52 from the polygonal-line data 51.

Figure 4:
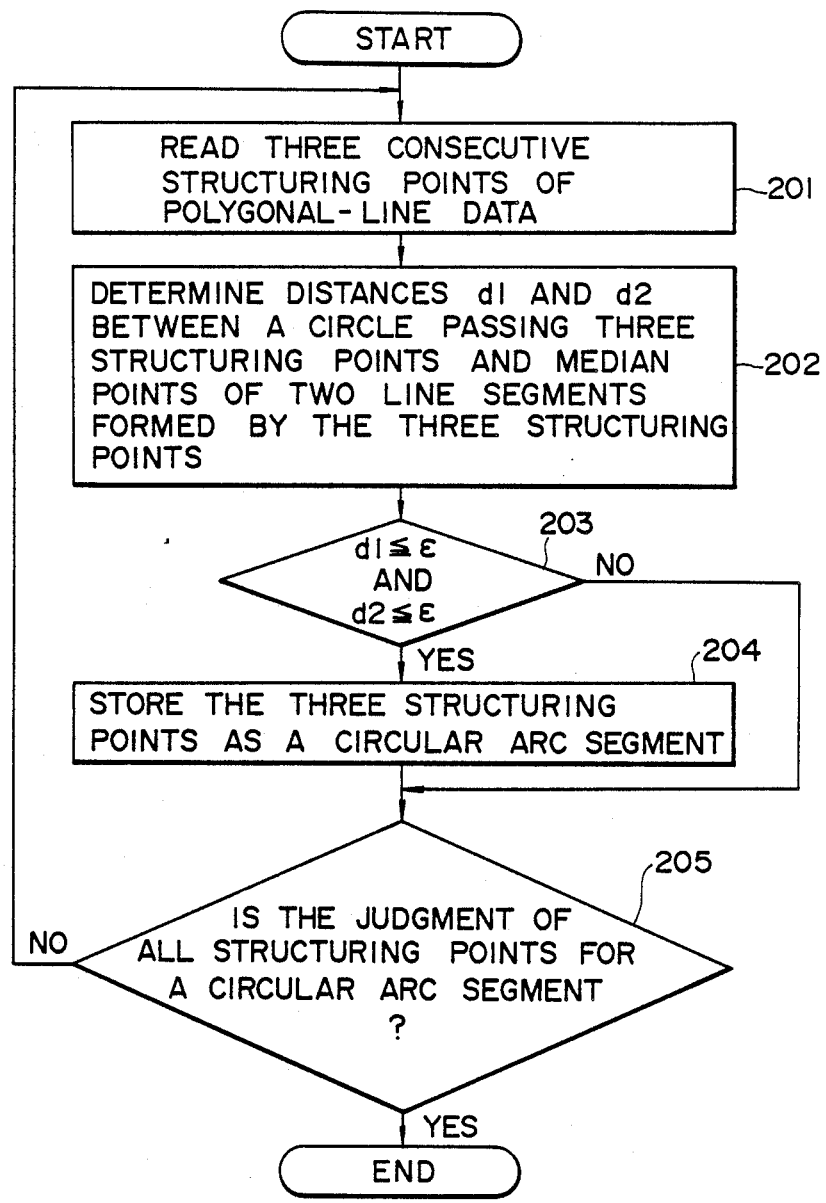
FIG. 4 is a flow chart illustrating processing flows for circular arc or arcuate segment recognition processing.
Figure 5:
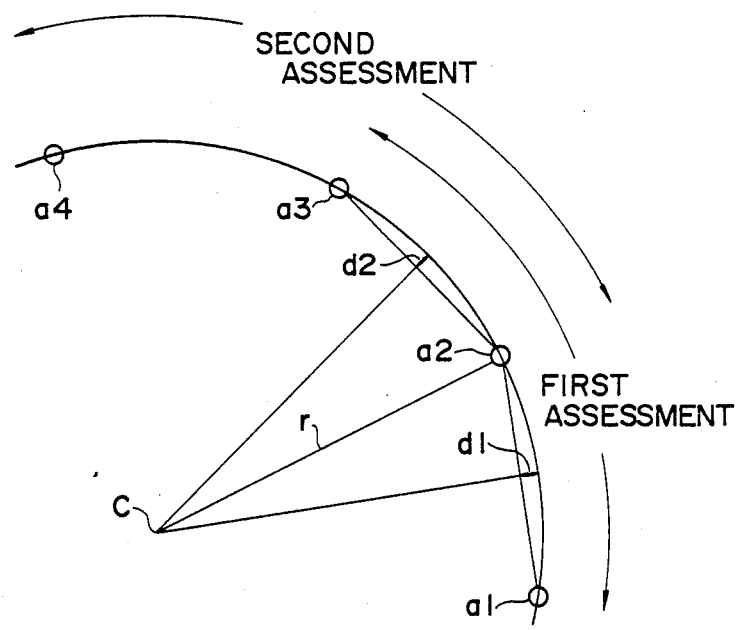
FIG. 5 is an explanation view for explaining the principle of the arcuate or circular arc segment recognition processing.
Figure 6:
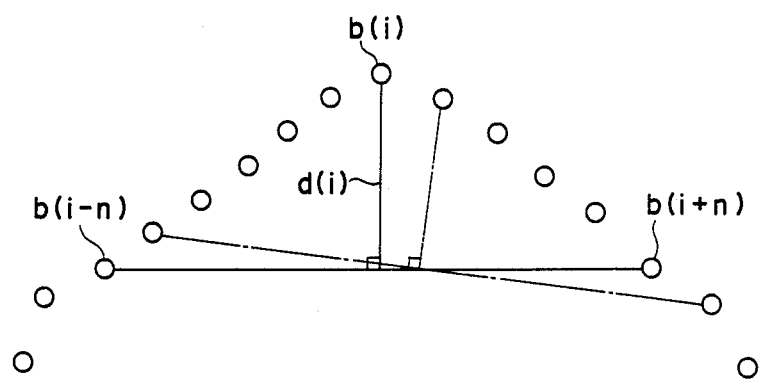
FIG. 6 is an explanation view for explaining a conventional arcuate or circular arc segment recognition technique.

FIG. 4 is a flow chart illustrating the flow for effecting the arcuate or circular arc segment recognition processing. FIG. 5 is an explanation view for explaining the principle of the arcuate or circular arc segment recognition processing. The arcuate or circular arc segment recognition processing will be described in accordance with FIG. 4 in conjunction with FIG. 5.

In the arcuate or circular arc segment recognition processing, at step 201, there are read three consecutive structuring points of the polygonal-line data (data of polygonal-line structuring points) obtained by the processing for conversion into a polygonal line as has been described hereinabove. For instance, as shown in FIG. 5, there are read three consecutive polygonal-line structuring points a1, a2, and a3. At step 202, there are determined distances d1 and d2 between a virtual circle passing through the read-in three structuring points and the respective median points of two line segments formed by the three structuring points. At step 203, it is then judged whether or not the distances d1 and d2 are both equal to or less than the constant distance $\epsilon$. When the distances d1 and d2 are both equal to or smaller than the constant distance $\epsilon$, on the one hand, the flow proceeds to step 204 where the three structuring points (for example, points a1, a2 and a3 as shown in FIG. 5) are stored as arcuate or circular arc segments. When at least one of the distances d1 and d2 is neither equal to nor lower than the constance distance $\epsilon$ at step 203, on the other hand, it is not judged that the three structuring points constitutes an arcuate or circular arc segment and the flow proceeds to step 205. At step 205, it is judged whether or not a judgment of all structuring points for an arcuate or circular arc segment is finished. If there is a structuring point that has not yet been judged therefor, the flow then returns back to step 201 and the processing for recognizing an arcuate or circular arc segment is repeated. When the judgment of all the structuring points for an arcuate or circular arc segment is finished at step 205, the arcuate or circular arc segment recognition processing is completed. This processing permits a judgment of an arcuate or circular arc segment by repeating the arcuate or circular arc segment recognition processing by staggerring three consective polygonal-line structuring points in the order. For instance, a first assessment is executed to judge an arcuate or circular arc segment for points a1, a2 and a3, and a second assessment is executed to judge an arcuate or circular arc segment for points a2, a3 and a4. Accordingly, if the first assessment does not judge an arcuate or circular arc segment, the point a1 is not judged as part of an arcuate or circular arc segment.

As described hereinabove, the method of recognizing an arcuate or circular arc segment according to one embodiment of the present invention permits the processing of judging an arcuate or circular arc segment for each of three consecutive polygonal-line structuring points by means of the arcuate or circular arc recognition processing for each of polygonal-line structuring points which are determined in such a state that all the dot-line pixels of the dot-line image data between the two polygonal-line structuring points are present in a width of the constant distance $\epsilon$ apart from and in a direction perpendicular to the straight center line connecting the two adjacent polygonal-line structuring points. This enables the virtual circle and the dot-line pixels of the dot line image data to be judged as being both present in the constant distance $\epsilon$ from the straight center line connecting the two adjacent polygonal-line structuring points within a range constituted by the three polygonal-line structuring points, thereby recognizing this segment to be recognized as an arcuate or circular arc segment. In other words, this can recognize a portion of a circular arc or arcuate segment or a portion of a regular polygon having a substantially great number of corners from a portion of a regular polygon having a small number of corners.

This processing allows a contour line of an arcuate or circular arc segment to be recognized without statistical processing of individual dot-line pixels of a dot-line image data and permits a judgment of the arcuate or circular arc segment in the dot-line image data with high speed. Furthermore, it is to be noted that, as a constant distance $\epsilon$ as a judgment standard in a series of the processing gets smaller, a portion of a regular polygon having a smaller angle and a greater number of corners can be distinguished and recognized with accuracy.

The present invention has been described by way of examples, but it is to be understood that the present invention is not limited to those examples and encompasses various variations and modifications within a scope of the present invention.

As described hereinabove, in the case where a circle and an arcuate or circular arc segment is recognized from the dot-line image data and separated by recognizing a scope of its arcuate or circular arc segment, unlike such a conventional statistical technique as described hereinabove, the present invention permits a recognition of a circle and an arcuate or circular arc segment with high speeds by the image processing apparatus because polygonal-line structuring points are extracted by converting the dot-line image data and each of three consecutive polygonal-line structuring points are judged in the order as to whether to constitute an arcuate or circular arc segment. Furthermore, the present invention presents the advantage that a variation in a constant distance $\epsilon$ to be used as a judgment standard in the polygonal-line conversion processing and the arcuate or circular arc segment recognition processing permits an easy change of a limit on a radial range of a circle and an arcuate or circular arc segment to be recognized, thus recognizing a circle and an arcuate or circular arc segment with a smaller radius.

What is claimed is:

1. A method of recognizing an arcuate or circular arc segment for an image processing apparatus having means for inputting an image, means for storing the input image as dot-line image data, means for storing polygonal-line data extracted as polygonal-line structuring points from the dot-line image data, and processing means for extracting polygonal-line structuring points as polygonal-line data from the dot-line image data, wherein an arcuate or circular arc segment is recognized from the polygonal-line data, said method comprising:
   a first step of selecting an arbitrary image structuring point from the dot-line image data as a first selected structuring point and selecting an image structuring point apart from the first selected structuring point by a predetermined distance as a second selected structuring point;
   a second step of extracting, from the image structuring points located on the segment between the first selected structuring point and the second selected structuring point, an image structuring point located furthest from a straight line connecting the first selected structuring point and the second selected structuring point to each other, calculating the distance from the extracted image structuring point to the straight line, and judging the extracted image structuring point as a polygonal-line structuring point when the calculated distance is equal to or larger than a predetermined value;
   a third step of executing the processing of the second step again using the extracted polygonal-line structuring point as the second selected structuring point to extract a next polygonal-line structuring point, and repeating the processing for extracting a next polygonal-line structuring point, successively; and
   a fourth step of selecting three consecutive, adjacent polygonal-line structuring points, in order, from the extracted polygonal-line structuring points, when three or more polygonal-line structuring points are extracted, forming a virtual circle passing through the selected three polygonal-line structuring points, determining the respective median points of the respective line segments formed by each adjacent two polygonal-line structuring points, and judging whether or not the distance from the median point to the virtual circle is equal to or smaller than a predetermined value in order to recognize an arcuate or circular arc segment.

2. A method of recognizing an arcuate or circular arc segment for an image processing apparatus as claimed in claim 1, wherein the first selected structuring point in the first step is one of a plurality of image structuring points extracted at predetermined intervals from the input dot-line image data, and each of the first step to third step is repeatedly executed by updating the selecting of the first selected structuring point from the plurality of image structuring points.

3. A method of recognizing an arcuate or circular arc segment for an image processing apparatus as claimed in claim 2, wherein the first selected structuring point is extracted as a polygonal-line structuring point.

4. A method of recognizing an arcuate or circular arc segment for an image processing apparatus as claimed in claim 2, wherein the second selected structuring point is selected as a next first selected structuring point to be extracted, after the first selected structuring point is selected from the plurality of image structuring points.

* * * * *